(12) United States Patent
Miyahara

(10) Patent No.: US 7,545,956 B2
(45) Date of Patent: Jun. 9, 2009

(54) SINGLE CAMERA SYSTEM AND METHOD FOR RANGE AND LATERAL POSITION MEASUREMENT OF A PRECEDING VEHICLE

(75) Inventor: Shunji Miyahara, Yokohama (JP)

(73) Assignee: Visteon Global Technologies, Inc., Van Buren Township, MI (US)

( * ) Notice: Subject to any disclaimer, the term of this patent is extended or adjusted under 35 U.S.C. 154(b) by 632 days.

(21) Appl. No.: 11/202,917

(22) Filed: Aug. 12, 2005

(65) Prior Publication Data

US 2007/0035385 A1   Feb. 15, 2007

(51) Int. Cl.
G06K 9/00 (2006.01)
(52) U.S. Cl. .................... 382/106; 340/435
(58) Field of Classification Search .............. 382/106; 340/435
See application file for complete search history.

(56) References Cited

U.S. PATENT DOCUMENTS

| 5,790,403 | A  | 8/1998  | Nakayama       |
| 5,901,806 | A  | 5/1999  | Takahashi      |
| 6,459,982 | B1 | 10/2002 | Kabayashi et al. |
| 6,470,257 | B1 | 10/2002 | Seto           |
| 6,484,086 | B2 | 11/2002 | Jeon           |
| 6,556,913 | B2 | 4/2003  | Morizane et al. |
| 6,580,385 | B1 | 6/2003  | Winner et al.  |
| 6,708,099 | B2 | 3/2004  | Tellis et al.  |
| 6,771,208 | B2 | 8/2004  | Lutter et al.  |
| 6,792,344 | B2 | 9/2004  | Minowa et al.  |
| 6,795,014 | B2 | 9/2004  | Cheong         |
| 6,825,778 | B2 | 11/2004 | Bergan et al.  |
| 6,834,232 | B1 | 12/2004 | Malhotra       |
| 6,856,887 | B2 | 2/2005  | Akabori et al. |
| 6,859,716 | B2 | 2/2005  | Kikuchi        |
| 6,873,899 | B2 | 3/2005  | Sawamoto       |
| 6,873,911 | B2 | 3/2005  | Nishira et al. |
| 2002/0057195 | A1 | 5/2002 | Yamamura      |
| 2003/0045990 | A1 | 3/2003 | Adachi        |
| 2003/0204299 | A1 | 10/2003 | Waldis et al. |

(Continued)

FOREIGN PATENT DOCUMENTS

JP      11-142168      5/1999

(Continued)

OTHER PUBLICATIONS

Cheok et al., "A Multisensor-Based Collision Avoidance System with Application to a Military HMMWV", Oct. 2000, IEEE Intelligent Transportation Systems, pp. 288-292.*

(Continued)

Primary Examiner—John B Strege
(74) Attorney, Agent, or Firm—Brinks Hofer Gilson & Lione

(57) ABSTRACT

A system for determining range and lateral position of a vehicle is provided. The system includes a camera, a sonar and a processor. The camera is configured to view a long range region of interest and generate an electrical image of the region. The sonar is configured to view a short range region of interest an output a sonar signal. The processor is in electrical communication with the camera and the sonar to receive the electrical image and the sonar signal. The processor analyzes the image and the sonar signal in order to determine the range of an object.

44 Claims, 5 Drawing Sheets

U.S. PATENT DOCUMENTS

| | | | |
|---|---|---|---|
| 2004/0056950 A1* | 3/2004 | Takeda | 348/92 |
| 2004/0061626 A1 | 4/2004 | Kubota | |
| 2004/0149504 A1 | 8/2004 | Swoboda et al. | |
| 2004/0176900 A1 | 9/2004 | Yajima | |
| 2005/0010351 A1 | 1/2005 | Wagner et al. | |
| 2005/0102070 A1 | 5/2005 | Takahama et al. | |

FOREIGN PATENT DOCUMENTS

| | | |
|---|---|---|
| JP | 2003-143597 | 5/2003 |

OTHER PUBLICATIONS

Srinivasa et al, "A Fusion for Real-Time Forward Collision Warning in Automobiles", 2003, IEEE, pp. 457-462.*

Stein et al, "Vision-based ACC with a Single Camera: Bounds on Range and Range Rate Accuracy", 2003, IEEE, pp. 120-125.*

Kim et al., "Front and Rear Vehicle Detection and Tracking in the Day an Night Times Using Vision and Sonar Fusion", Aug. 2-6, 2005, IEEE, pp. 2173-2178.*

"Environment Recognition Technologies for Supporting Safe Driving", Author(s): Kazuaki Takano, Tatsuhiko Monji, Hiroshi Kondo, Dr. Eng, Yuji Otsuka, 2004.

"Giving Vision to Vehicles", Author: Eric J. Lerner, Aug. 2002.

"Beyond cruise control", source(s): www.economist.com/science/tq/PrinterFriendly.cfm?Story_662334, Jun. 21, 2001.

"Pedestrian Detection Review", source(s): http://path.berkeley.edu/~cychan/Research_and_Presentation/Pedestrian_Detection_TO5200/Literature_Review_v4.pdf, Apr. 2005.

"Game-like interfaces for Toyota concept car", source(s): http://www.sae.org/automag/electronics/06-2004/1-112-6-337.pdf.

"Mobile Vision", source(s): http://www.aglaia-gmbh.de/videos/doc/AMAA-2004-03-25-Aglaia-Visual-Sensors.pdf.

* cited by examiner

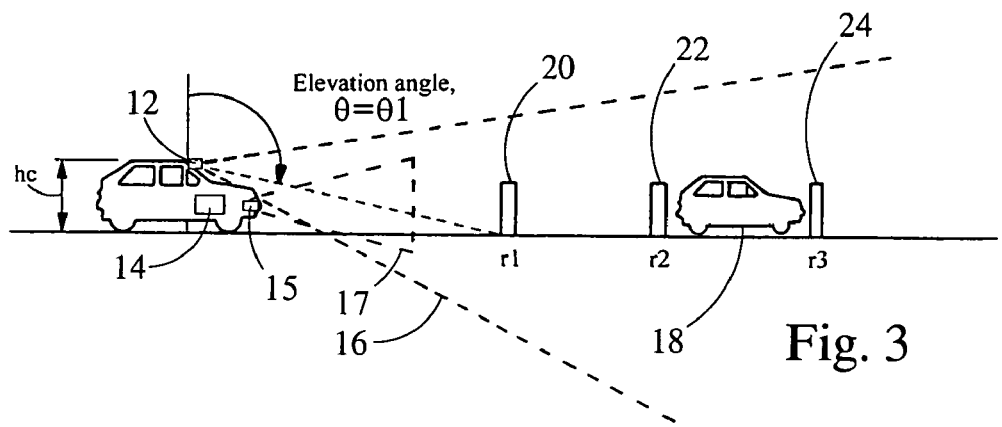
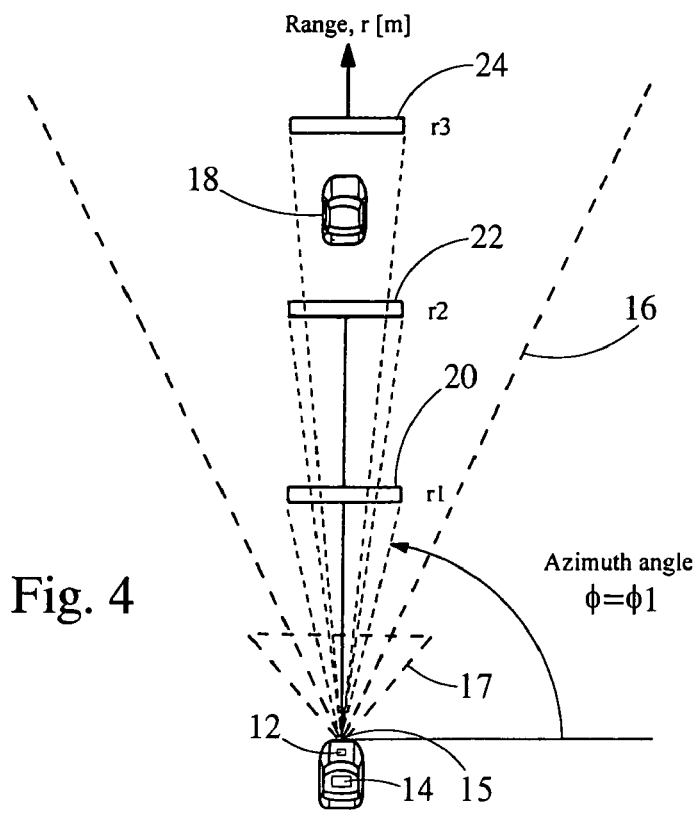
Fig. 3
Fig. 4
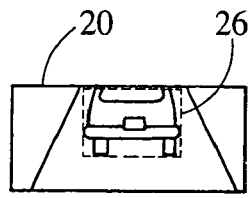
Fig. 5A
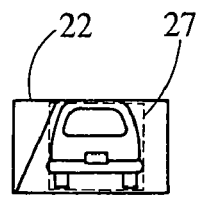
Fig. 5B
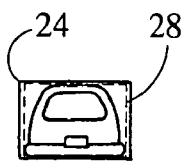
Fig. 5C

US 7,545,956 B2

SINGLE CAMERA SYSTEM AND METHOD FOR RANGE AND LATERAL POSITION MEASUREMENT OF A PRECEDING VEHICLE

BACKGROUND

1. Field of the Invention

The present invention generally relates to a system and method for range and lateral position measurement of a preceding vehicle.

2. Description of Related Art

Radar and stereo camera systems for adaptive cruise control (ACC), have been already introduced into the market. Recently, radar has been applied to for pre-crash safety systems and collision avoidance. Typically, the range and lateral position measurement of a preceding vehicle is accomplished utilizing radar and/or stereo camera systems. Radar systems can provide a very accurate range. However, millimeter wave type radar systems such as 77 Ghz systems are typically quite expensive. Laser radar is low cost but has the drawback of requiring moving parts which scan the laser across a field of view. Furthermore, the laser is less effective in adverse weather conditions which may effect the reflectivity of the preceding vehicle. For example, if mud covers the reflectors of the preceding vehicle, the reflectivity of the preceding vehicle will be less which minimizes the effectiveness of the laser. Finally, radar generally is not well suited to identify the object and give an accurate lateral position.

Stereo cameras can determine the range and identity of an object. However, these systems are typically difficult to manufacture due to the accurate alignment required between the two stereo cameras and requires two image processors.

In view of the above, it can be seen that conventional ACC systems typically do not have a high cost-performance ratio even though they may perform to the desired functional requirements. Further, it is apparent that there exists a need for an improved system and method for measuring the range and lateral position of the preceding vehicle.

SUMMARY

In satisfying the above need, as well as overcoming the enumerated drawbacks and other limitations of the related art, the present invention provides a system for determining range and lateral position of a vehicle. The primary components of the system include a single camera, at least one sonar sensor and a processor. The camera is configured to view a first region of interest containing a preceding vehicle and generate an electrical image of the region. The processor is in electrical communication with the camera to receive the electrical image. To analyze the electrical image, the processor identifies a series of windows within the image, each window corresponding to a fixed physical size at a different target range. For example, from the perspective of the camera the vehicle will appear larger when it is closer to the camera than if it is further away from the camera. Accordingly, each window is sized proportionally in the image as it would appear to the camera at each target range. The processor evaluates characteristics of the electrical image within each window to identify the vehicle. For example, the size of the vehicle is compared to the size of the window to create a size ratio. A score is determined indicating the likelihood that certain characteristics of the electrical image actually correspond to the vehicle and also that the vehicle is at the target range for that window.

The sonar sensor is configured to view a second region of interest. The processor receives data indicating if the preceding vehicle is in the second field of view. If the processor determines that the preceding vehicle is within the second field of view, the processor will calculate the range of the preceding vehicle based on the data generated by the sonar sensor.

In another aspect of the present invention, the characteristics of electrical image evaluated by the processor includes the width and height of edge segments in the image, as well as, the height, width, and location of objects constructed from multiple edge segments. The position of the window in the electrical image is calculated based on the azimuth angle and the elevation angle of the camera.

In yet another aspect of the present invention, a method is provided for identifying the vehicle within the electrical image and a sonar signal to determine the vehicle range. To simplify the image, an edge enhanced algorithm is applied to the image. Only characteristics of the electrical image within a particular window are evaluated. The edge enhanced image is trinalized and segmented. The segments are evaluated and objects are constructed from multiple segments. A score is determined for each object based on criteria, such as, the object width, object height position, object height, and segment width. Based on the width ratio, the range and lateral position of the object are estimated on the basis of the target range of the window. However, if the sonar signal indicates that the object is closer than estimated by evaluating the electrical image, the sonar signal will be used to estimate the range of the object.

Further objects, features and advantages of this invention will become readily apparent to persons skilled in the art after a review of the following description, with reference to the drawings and claims that are appended to and form a part of this specification.

BRIEF DESCRIPTION OF THE DRAWINGS

FIG. 3 is a side view of the system illustrating the calculation of the upper and lower edge of the windows in accordance with the present invention;

FIG. 4 is a top view of the system illustrating the calculation of the left and right edge of the windows, in accordance with the present invention;

FIG. 5A is a view of the electronic image, with only the image information in the first window extracted;

FIG. 5B is a view of the electronic image, with only the image information in the second window extracted;

FIG. 5C is a view of the electronic image, with only the image information in the third window extracted;

DETAILED DESCRIPTION

Figure 1:
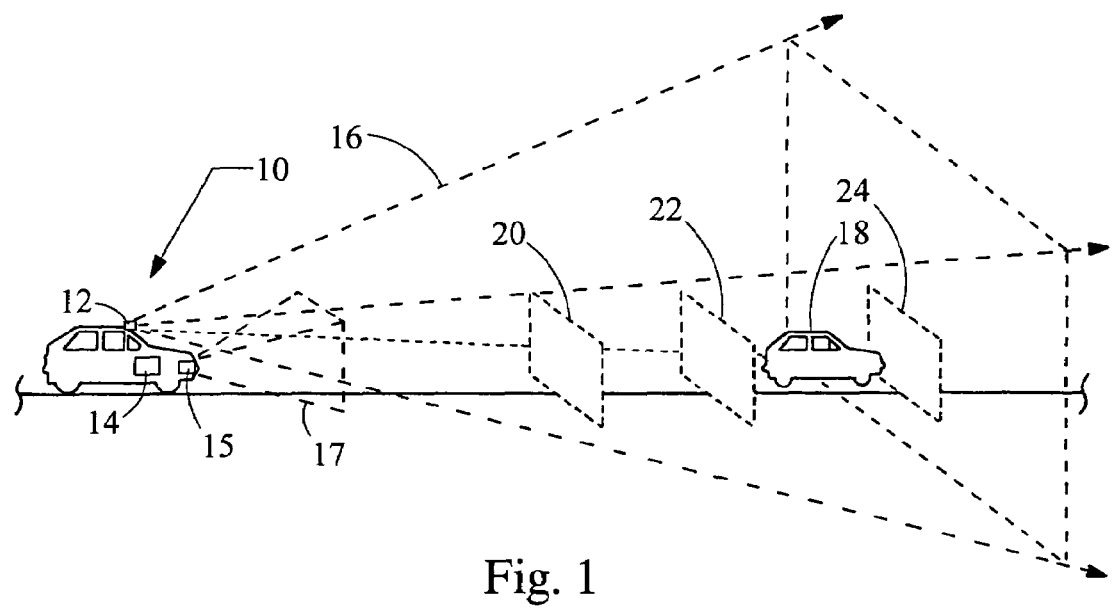
FIG. 1 is a side view of a system for range and lateral position measurement of a preceding vehicle, embodying the principles of the present invention.

Referring now to FIG. 1, a system embodying the principles of the present invention is illustrated therein and designated at 10. As its primary components, the system 10 includes a camera 12, a sonar sensor 15 and a processor 14. The camera 12 is located in the rearview mirror to collect an optical image of a first region of interest 16 including a vehicle 18. The sonar sensor 15 is located near the front bumper of the vehicle to collect data of a second region of interest 17. Typically, the first and second regions of interest 16, 17 partially overlap.

The optical image received by the camera 12, is converted to an electrical image that is provided to the processor 14. To filter out unwanted distractions in the electronic image and aid in determining the range of the vehicle 18, the processor 14 calculates the position of multiple windows 20, 22, 24 within the first region of interest 16. The windows 20, 22, 24 are located at varying target ranges from the camera 12. The size of the windows 20, 22, 24 are a predetermined physical size (about 4×2 m as shown) and may correspond to the size of a typical vehicle. To provide increased resolution the windows 20, 22, 24 are spaced closer together and the number of windows is increased. Although the system 10, as shown, is configured to track a vehicle 18 preceding the system 10, it is fully contemplated that the camera 12 could be directed to the side or rear the system 10 to track a vehicle 18 that may be approaching from other directions.

Figure 2:
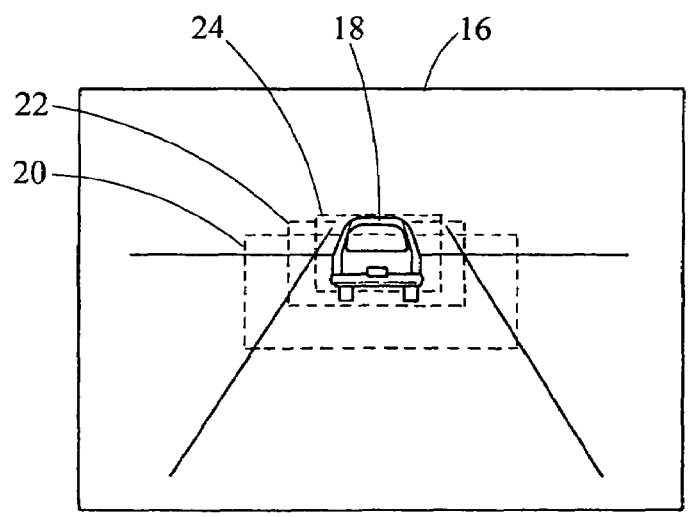
FIG. 2 is a view of an electronic image from the perspective of the camera in FIG. 1.

Now referring to FIG. 2, an electronic image of the first region of interest 16 as viewed by the camera 12 is provided. The windows 20, 22, 24 are projected into their corresponding size and location according to the perspective of the camera 12. The vehicle 18 is located between windows 22 and 24, accordingly, the size of the vehicle 18 corresponds much more closely to the height and width of windows 22 and 24 than window 20. As can be seen from FIG. 1, although the size and width of the windows are physically constant at each target range, the window sizes appear to vary from the perspective of the camera 12. Similarly, the height and width of the preceding vehicle 18 will appear to vary at each target range. The perspective of the camera 12 will affect the apparent size and location of the preceding vehicle 18 within the electrical image based on the elevation angle and the azimuth angle of the camera 12. The processor 14 can use the location and size of each of the windows 20, 22, 24 to evaluate characteristics of the electrical image and determine a score indicating the probability the vehicle 18 is at the target range associated with a particular window.

Now referring to FIG. 3, a side view of the system 10 is provided illustrating the use of the elevation angle in calculating the height and position of the window 20 within the electrical image. The elevation angle is the angle between the optical axis of the camera 12 and the surface of the road. The lower edge of window 20 is calculated based on Equation (1).

$$\theta_1 = a\tan(-r1/hc) \quad (1)$$

Where hc is the height of the camera 12 from the road surface, r1 is the horizontal range of window 20 from the camera 12, and the module is $[0, \pi]$.

Similarly, the upper edge of the first window is calculated based on Equation (2).

$$\theta_{1h} = a\tan(rc/(hw-hc)) \quad (2)$$

Where hw is the height of the window, hc is the height of the camera 12 from the road surface, r1 is the range of window 20 from the camera 12, and the module is $[0, \pi]$. The difference, $\Delta\theta_1 = \theta_1 - \theta_{1h}$, corresponds to the height of the window in the electronic image.

Now referring to FIG. 4, the horizontal position of the window in a picture corresponds to the azimuth angle. The azimuth angle is the angle across the width of the preceding vehicle from the perspective of the camera 12. The right edge of the range window 20 is calculated according to Equation (3).

$$\phi_1 = a\tan(-width_{13} w/(2*r1)) + (\pi/2) \quad (3)$$

Similarly, the left edge of the range window 20 is calculated according to Equation (4).

$$\phi_{1h} = a\tan(width_{13} w/(2*r1)) + (\pi/2) \quad (4)$$

Where window w is the distance from the center of the window 20 to the horizontal edges, r1 is the horizontal range of the window 20 from the camera 12, and the module is $[-\pi/2, \pi/2]$.

The window positions for the additional windows 22, 24 are calculated according to Equations (1)-(4), substituting their respective target ranges for r1.

Now referring to FIG. 5A, the electronic image is shown relative to window 20. Notice the width of the object 26 is about 30% of the width of the window 20. If the window width is set at a width of 4 m, about twice the expected width of the vehicle 18, the estimated width of the object 26 at a distance of r1 would equal 4×0.3=1.2 m. Therefore, the likelihood that the object 26 is the vehicle 18 at range r1 is low. In addition, the processor 14 evaluates vertical offset and object height criteria. For example, the distance of the object 26 from the bottom of the processing window 20 is used in determining likelihood that the object 26 is at the target range. Assuming a flat road, if the object 26 were at the range r1, the lowest feature of the object 26 would appear at the bottom of the window 20 corresponding to being in contact with the road at the target range. However, the object 26 in FIG. 5A, appears to float above the road, thereby decreasing the likelihood it is located at the target range. Further, the extracted object 26 should have a height of 0.5 m or 1.2 m. The processor 14 will detect an object height of 0.5 m if only the bottom portion of the vehicle 18 is detected or 1.2 m if the full height of the vehicle 18 is detected. The closer the height of the object 26 is to the expected height the more probable the object 26 is the vehicle 18 and the more probable it is located at the target range r1. The vertical offset, described above, may also affect the height of the object 26, as the top of the object, in FIG. 5A, is chopped off by the edge of the window 20. Therefore, the object 26 appears shorter than expected, again lowering the likelihood the object is the vehicle 18 at the range r1.

Now referring to FIG. 5B, the electronic image is shown relative to window 22. The width of the object 27 is about 45% of the window 22. Therefore, the estimated width of the object 27 at range r2 is equal to 4×0.45=1.8 m much closer to the expected size of the vehicle 18. In this image, the object 27 is only slightly offset from the bottom of the window 22, and the entire height of the object 27 is still included in the window 22.

Now referring to FIG. 5C, the electronic image is shown relative to window 24. The width of the object 28 is about 80% of the width of the window 24. Accordingly, the estimated width of the object 28 at range r3 is equal to 4×0.08=3.2 m. Therefore, the object width is significantly larger than the expected width of vehicle 18, usually about 1.75 m. Based on the object width, the processor 14 can make a determination that object 27 most probably corresponds to vehicle 18 and r2 is the most probable range. The range accuracy of the system 10 can be increased by using a finer pitch of target range for each window. Using a finer pitch between windows is especially useful as the vehicle 18 is closer to the camera 12, due to the increased risk of collision.

Figure 6:
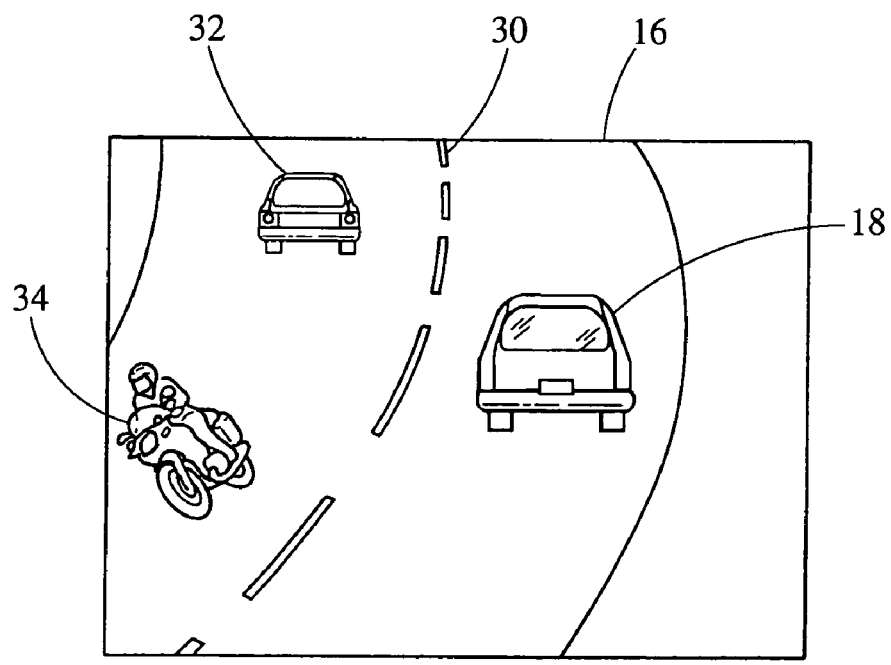
FIG. 6 is a view of an electronic image generated by the camera prior to processing.

Now referring to FIG. 6, a typical electronic image as seen by the camera 12 is provided and will be used to further describe the method implemented by the processor 14 to determine the range and lateral position of the vehicle 18. The electronic image includes additional features that could be confusing for the processor 14 such as the lane markings 30, an additional car 32, and a motorcycle 34.

Figure 7:
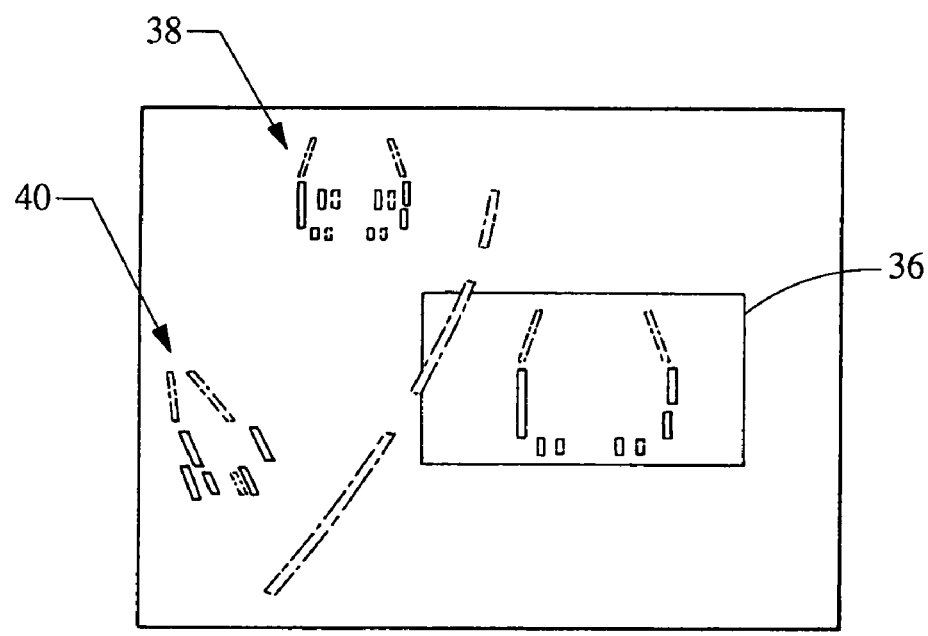
FIG. 7 is a view of the electronic image after a vertical edge enhancement algorithm has been applied to the electronic image shown in FIG. 6.
Figure 8:
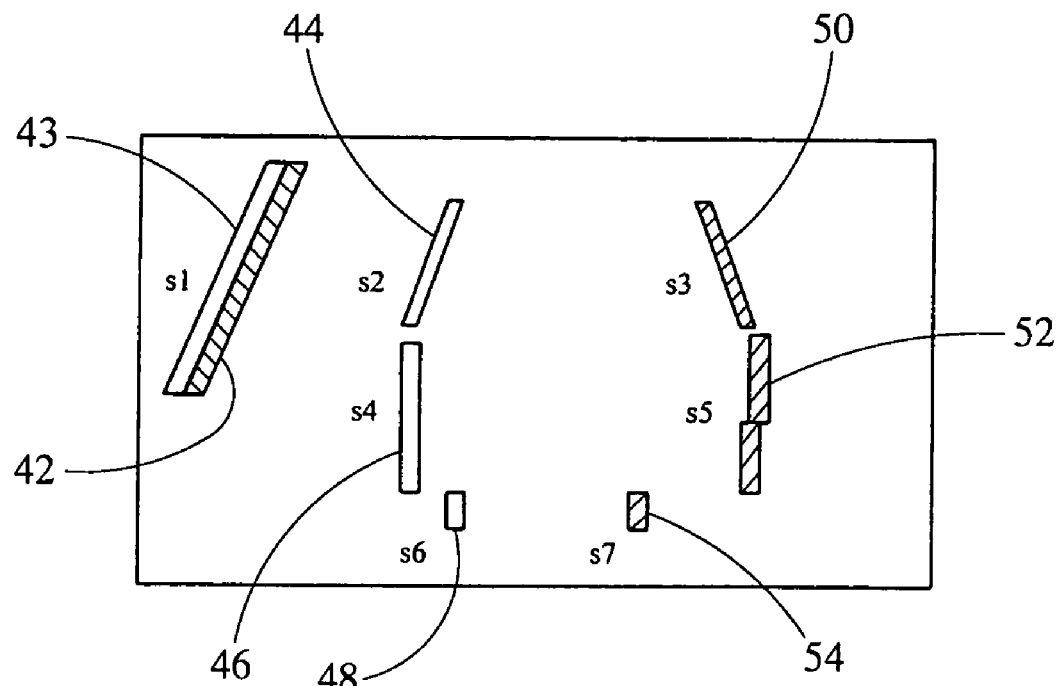
FIG. 8 is a view of the electronic image including segments that are extracted from the edge enhanced image.

FIG. 7 shows a vertically edge enhanced image. The electronic image is comprised of horizontal rows and vertical columns of picture elements (pixels). Each pixel contains a value corresponding to the brightness of the image at that row and column location. A typical edge enhancement algorithm includes calculating the derivative of the brightness across the horizontal rows or vertical columns of the image. However, many other edge enhancement techniques are contemplated and may be readily used. In addition, the position and size of the window 36 is calculated for a given target range. Edge information located outside the window 36 is ignored. In this instance, much of the edge enhanced information from the car 38 and the motorcycle 40 can be eliminated.

Figure 9:
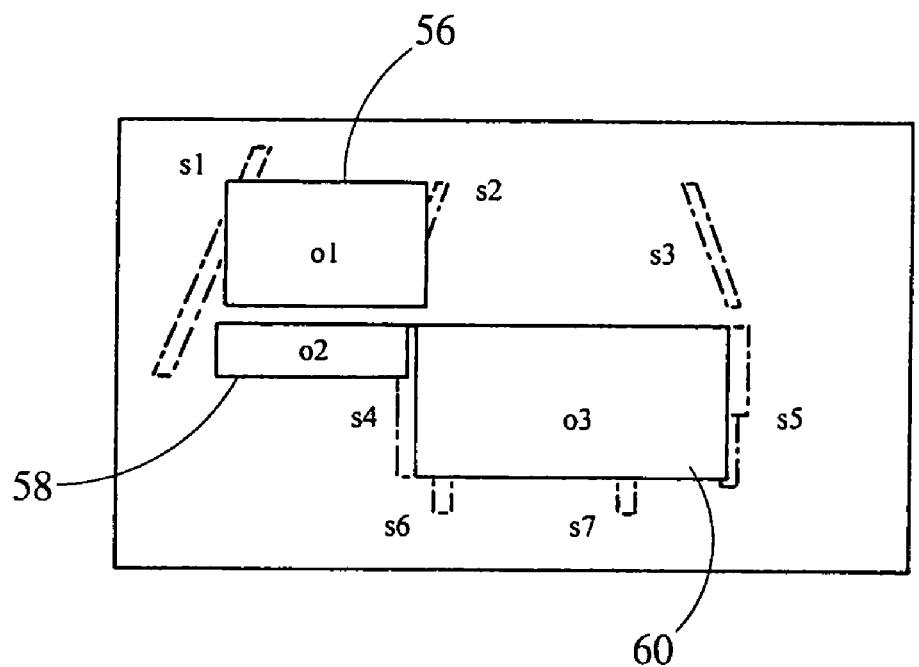
FIG. 9 is a view of the electronic image including objects constructed from the segments illustrated in FIG. 8.

Now referring to FIG. 9, the edge enhanced image is then trinarized, meaning each of the pixels are set to a value of −1, +1, or 0. A typical method for trinarizing the image includes taking the value of each pixel value and applying an upper and lower threshold value, where if the brightness of the pixel value is above the upper threshold value, the pixel value is set to 1. If the brightness of the pixel value is below the lower threshold value, the pixel value is set to −1. Otherwise, the pixel value is set to 0. This effectively separates the pixels into edge pixels with a bright to dark (negative) transition, edge pixels with a dark to bright (positive) transition, and non-edge pixels. Although, the above described method is fast and simple, other more complicated thresholding methods may be used including local area thresholding or other commonly used approaches. Next, the pixels are grouped based on their relative position to other pixels having the same value. Grouping of these pixels is called segmentation and each of the groups is referred to as a line-segment. Height, width and position information is stored for each line-segment.

Relating these segments back to the original image, Segment 42 and 43 represent the lane marking on the road. Segment 44 represents the upper portion of the left side of the vehicle. Segment 46 represents the lower left side of the vehicle. Segment 48 represents the left tire of the vehicle. Segment 50 represents the upper right side of the vehicle. Segment 52 represents the lower right side of the vehicle while segment 54 represents the right tire.

Still referring to FIG. 9, objects may be constructed from two segments having different polarity. Segment 42 and segment 44 are combined to construct object 56. Segment 42 and segment 46 are combined to construct object 58. In segment 46 and segment 52 are combined to construct object 60. Each of the objects are then scored based on the width of the object, the height of the object, the position of the object relative to the bottom edge of the window, the segment width, and the segment height. The above process is repeated for multiple windows with different target ranges. The object with the best score is compared with a minimum score threshold. If the best score is higher than the minimum score threshold the characteristics of the object are used to determine the object's range and lateral position.

Figure 10:
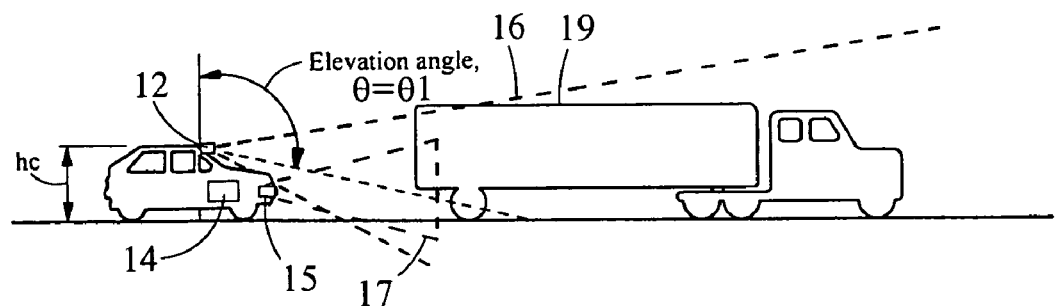
FIG. 10 is a side view of the system for range and lateral position measurement of a large preceding vehicle, embodying the principles of the present invention.

Now referring to FIG. 10, a sideview of the system 10 is provided illustrating the use of the sonar sensor 15 in estimating the range of a large vehicle 19, such as a semi truck having a trailer. In certain low speed situations, such as a traffic backup, it is preferable to follow the preceding vehicle at a close distance. As shown in FIG. 10, the larger vehicle 19 is within the first and second regions of interest 16, 17.

Figure 11:
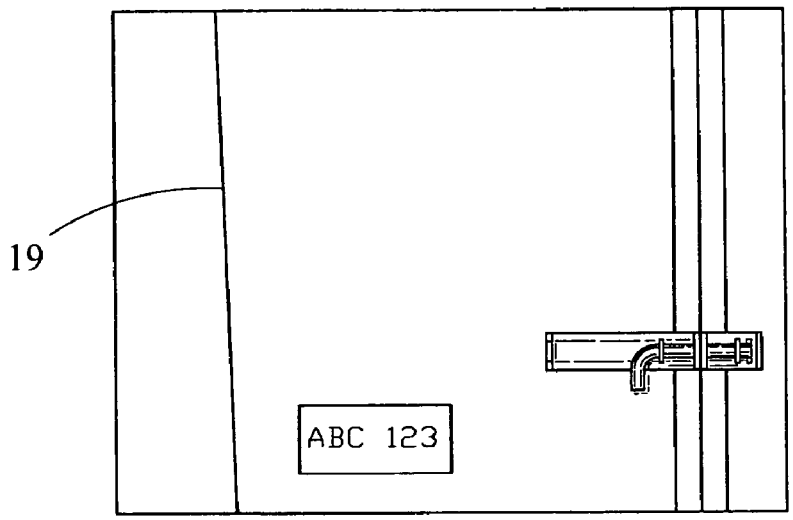
FIG. 11 is a view of the electronic image generated by the camera prior to processing.

Now referring to FIG. 11, a typical electronic image as seen by the camera 12 is provided and will be used to further describe the method implemented by the processor 14 to determine the range and lateral position of the larger vehicle 19. When following closely to a larger vehicle 19, only a portion of the larger vehicle 19 will be within view of the camera 12. The electronic image as seen in FIG. 11 will be vertically edge enhanced and then trinalized as described previously.

Figure 12:
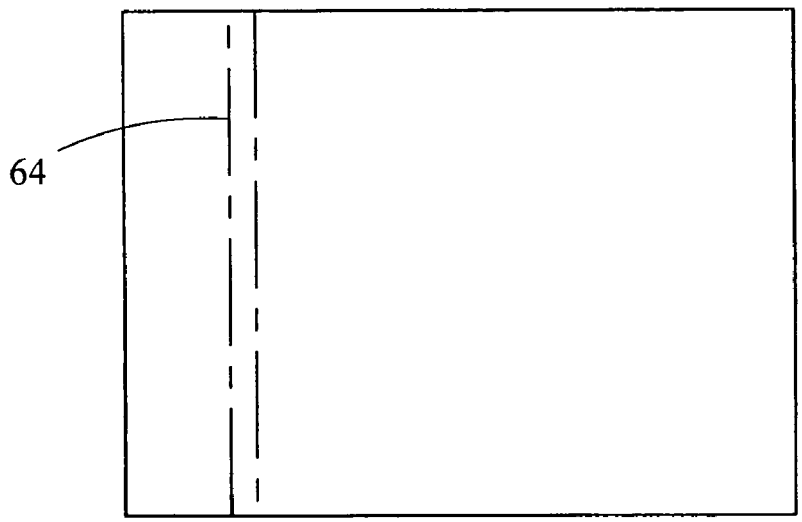
FIG. 12 is a view of the electronic image after the vertical edge enhancement algorithm has been applied the electronic image shown in FIG. 11.

Referring to FIG. 12, a trinalized image of the electronic image is shown. However, because of the size of the larger vehicle 19 and the closeness of the larger vehicle 19 to the camera 12, only the edge of the larger vehicle, as represented by segment 64, is shown. The processor 14 will be unable to determine if the edge 64 represents a vehicle, such as the larger vehicle 19, a lane marker, a tree or other object.

In order to take into account situations as described above, the processor 14 will receive data from the sonar sensor 15. The sonar sensor 15 has a shorter range than the camera 12 as illustrated by the second region of interest 17. The inherent characteristics of sonar sensor 15, which are well known in the art, allow the sonar sensor 15 to detect large objects, such as the larger vehicle 19, that would otherwise be undetectable to the processed image captured by camera 12. If the processor 14 received data from the sonar sensor 15 indicating that a vehicle is present and undetected by the camera 12 in the first region of interest, the processor 14 will use the data generated by the sonar sensor 15 to calculate the range of the larger vehicle 19.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

I claim:

1. A system for determining range of a vehicle, the system comprising:

a camera configured to view a first region of interest including the vehicle and generate an electrical image of the region;

a sonar sensor configured to detect objects within a second region of interest;

processor in electrical communication with the camera to receive the electrical image, wherein the processor is configured to identify a plurality of windows within the electrical image, each window of the plurality of windows corresponding to a predetermined physical size and target range from the camera, the processor being further configured to evaluate characteristics of a candidate object in relation to each window to identify the vehicle;

the processor in electrical communication with the sonar sensor, the processor configured to identify objects detected by the sonar sensor and determine the range of the objects detected by the sonar sensor;

wherein the window position is determined based on an elevation angle of the camera; and wherein the lower edge of each window is calculated based on the relationship $\theta_1 = a\tan(-rc/hc)$ where hc is the height of the camera from the road surface, rc is the range of window from the camera, and the module is $[0, \pi]$.

2. The system according to claim 1, wherein the processor is configured to determine a score indicating likelihood the candidate object is the target.

3. The system according to claim 2, wherein the processor is configured to determine the score based on a size ratio between each window and the characteristics of the candidate object.

4. The system according to claim 1, wherein the predetermined physical size is based on vehicle characteristics.

5. The system according to claim 4, wherein the vehicle characteristics include a width of the vehicle.

6. The system according to claim 4, wherein the vehicle characteristics include a height of the vehicle.

7. The system according to claim 1, wherein the characteristics of the electrical image include edge segments within the electrical image.

8. The system according to claim 7, wherein the edge segments are vertical edge segments.

9. The system according to claim 7, wherein the characteristics of the electrical image include a height of the edge segments.

10. The system according to claim 7, wherein the characteristics of the electrical image include a width of the edge segments.

11. The system according to claim 7, wherein the characteristics of the electrical image include objects constructed from the edge segments.

12. The system according to claim 11, wherein the characteristics of the electrical image include a height of the objects.

13. The system according to claim 11, wherein the characteristics of the electrical image include a width of the objects.

14. The system according to claim 1, wherein a position of each window is determined based on the target range.

15. A system for determining range of a vehicle, the system comprising:
a camera configured to view a first region of interest including the vehicle and generate an electrical image of the region;
a sonar sensor configured to detect objects within a second region of interest;
a processor in electrical communication with the camera to receive the electrical image, wherein the processor is configured to identify a plurality of windows within the electrical image, each window of the plurality of windows corresponding to a predetermined physical size and target range from the camera, the processor being further configured to evaluate characteristics of a candidate object in relation to each window to identify the vehicle;
the processor in electrical communication with the sonar sensor, the processor configured to identify objects detected by the sonar sensor and determine the range of the objects detected by the sonar sensor;
wherein the window position is determined based on an elevation angle of the camera; and
wherein the upper edge of each window is calculated based on the relationship $\theta_{1h} = a\tan(r1/(hw-hc))$ where hw is a window height, hc is the height of the camera from the road surface, r1 is the range of window from the camera, and the module is $[0, \pi]$.

16. A system for determining range of a vehicle, the system comprising:
a camera configured to view a first region of interest including the vehicle and generate an electrical image of the region;
a sonar sensor configured to detect objects within a second region of interest;
a processor in electrical communication with the camera to receive the electrical image, wherein the processor is configured to identify a plurality of windows within the electrical image, each window of the plurality of windows corresponding to a predetermined physical size and target range from the camera, the processor being further configured to evaluate characteristics of a candidate object in relation to each window to identify the vehicle;
the processor in electrical communication with the sonar sensor, the processor configured to identify objects detected by the sonar sensor and determine the range of the objects detected by the sonar sensor;
wherein the position of each window is determined based on an azimuth angle of the camera; and
wherein the right edge of each window is calculated based on the relationship $\phi_1 = a\tan(-\text{width\_w}/(2r1)) + \pi/2$ where window w is the distance from the center of the window to the horizontal edges, r1 is the horizontal range of the window from the camera, and the module is $[-\pi/2, \pi/2]$.

17. A system for determining range of a vehicle, the system comprising:
a camera configured to view a first region of interest including the vehicle and generate an electrical image of the region;
a sonar sensor configured to detect objects within a second region of interest;
a processor in electrical communication with the camera to receive the electrical image, wherein the processor is configured to identify a plurality of windows within the electrical image, each window of the plurality of windows corresponding to a predetermined physical size and target range from the camera, the processor being further configured to evaluate characteristics of a candidate object in relation to each window to identify the vehicle;
the processor in electrical communication with the sonar sensor, the processor configured to identify objects detected by the sonar sensor and determine the range of the objects detected by the sonar sensor;
wherein the position of each window is determined based on an azimuth angle of the camera; and
wherein the left edge of each window is calculated based on the relationship $\phi_{1h} = a\tan(\text{width\_w}/r1) + \pi/2$ where window w is the distance from the center of the window to the horizontal edges, r1 is the horizontal range of the window from the camera, and the module is $[-\pi/2, \pi/2]$.

18. A method for determining range of a vehicle, the method comprising:
receiving an optical image of a first region of interest onto a camera;
receiving a sonar signal of a second region of interest onto a sonar;
generating an electrical image based on the optical image;

identifying a plurality of windows within the electrical image, each window corresponding to a predetermined physical size and a target range from the camera;

evaluating characteristics of a candidate object within each window signal to identify the vehicle;

evaluating the sonar signal to determine if objects are located within the second region of interest;

wherein the window Position is determined based on an elevation angle of the camera; and wherein the lower edge of each window is calculated based on the relationship $\theta_1 = a\ \tan(-r1/hc)$ where hc is the height of the camera from the road surface, r1 is the range of window from the camera, and the module is $[0, \pi]$.

19. The method according to claim 18, wherein the processor is configured to determine a score indicating likelihood the candidate object is a target vehicle.

20. The method according to claim 19, wherein the processor is configured to determine the score based on a size ratio between each window and the characteristics of the electrical image.

21. The method according to claim 18, wherein the predetermined physical size is based on vehicle characteristics.

22. The method according to claim 21, wherein the vehicle characteristics include a width of the vehicle.

23. The method according to claim 21, wherein the vehicle characteristics include a height of the vehicle.

24. The method according to claim 18, wherein the characteristics of the electrical image include edge segments within the electrical image.

25. The method according to claim 24, wherein the edge segments are vertical edge segments.

26. The method according to claim 24, wherein the characteristics of the electrical image include a height of the edge segments.

27. The method according to claim 24, wherein the characteristics of the electrical image include a width of the edge segments.

28. The method according to claim 24, wherein the characteristics of the electrical image include objects constructed from the edge segments.

29. The method according to claim 28, wherein the characteristics of the electrical image include a height of the objects.

30. The method according to claim 28, wherein the characteristics of the electrical image include a width of the objects.

31. The method according to claim 18, wherein a position of each window is determined based on the target range.

32. The method according to claim 18, wherein evaluating characteristics of the electrical image includes performing an edge enhancement algorithm to the electrical image.

33. The method according to claim 32, wherein the edge enhancement algorithm is a vertical edge enhancement algorithm.

34. The method according to claim 32, wherein evaluating characteristics of the electrical image includes extracting only the electrical image within the window.

35. The method according to claim 32, wherein evaluating characteristics of the electrical image includes binarizing the electrical image utilizing a threshold.

36. The method according to claim 32, wherein evaluating characteristics of the electrical image includes identifying segments from the binarized image.

37. The method according to claim 36, wherein evaluating characteristics of the electrical image includes constructing objects from the segments.

38. The method according to claim 37, wherein evaluating the electrical image, includes determining a score for each object based on the object width, object height position, object height, and segment width.

39. The method according to claim 38, wherein evaluating characteristics of the electrical image, further includes determining a range of the object that is based on the score of the object.

40. The method according to claim 18, further comprising the step of determining the range of objects located within the second region of interest using the sonar signal.

41. The method of claim 18, further comprising the step of:

determining if the object detected within the second region of interest is detected in the first region of interest;

using the sonar signal to determine the range of the object detected within the second region of interest if the object is not detected within the first region of interest.

42. A method for determining range of a vehicle, the method comprising:

receiving an optical image of a first region of interest onto a camera;

receiving a sonar signal of a second region of interest onto a sonar;

generating an electrical image based on the optical image;

identifying a plurality of windows within the electrical image, each window corresponding to a predetermined physical size and a target range from the camera;

evaluating characteristics of a candidate object within each window signal to identify the vehicle;

evaluating the sonar signal to determine if objects are located within the second region of interest;

wherein the window position is determined based on an elevation angle of the camera; and wherein the upper edge of each window is calculated based on the relationship $\theta_{1h} = a\ \tan(r1/(hw-hc))$ where hw is a window height, hc is the height of the camera from the road surface, r1 is the range of window from the camera, and the module is $[0, \pi]$.

43. A method for determining range of a vehicle, the method comprising:

receiving an optical image of a first region of interest onto a camera;

receiving a sonar signal of a second region of interest onto a sonar;

generating an electrical image based on the optical image;

identifying a plurality of windows within the electrical image, reach window corresponding to a predetermined physical size and a target range from the camera;

evaluating characteristics of a candidate object within each window signal to identify the vehicle;

evaluating the sonar signal to determine if objects are located within the second region of interest;

wherein the position of each window is determined based on an azimuth angle of the camera; and wherein the right edge of each window is calculated based on the relationship $\phi_1 = a\ \tan(-width_{13}/(2*r1)) + \pi/2$ where window w is the distance from the center of the window to the horizontal edges, r1 is the horizontal range of the window from the camera, and the module is $[-\pi/2, \pi/2]$.

44. method for determining range of a vehicle, the method comprising:

receiving an optical image of a first region of interest onto a camera;

receiving a sonar signal of a second region of interest onto a sonar;

generating an electrical image based on the optical image;

identifying a plurality of windows within the electrical image, each window corresponding to a predetermined physical size and a target range from the camera;

evaluating characteristics of a candidate object within each window signal to identify the vehicle;

evaluating the sonar signal to determine if objects are located within the second region of interest;

wherein the position of each window is determined based on an azimuth angle of the camera; and wherein the left edge of each window is calculated based on the relationship $\phi_{1h} = a\ \tan(\text{width\_w}/(2*r1)) + \pi/2$ where window w is the distance from the center of the window to the horizontal edges, r1 is the horizontal range of the window from the camera, and the module is $[-\pi/2, \pi/2]$.

* * * * *

UNITED STATES PATENT AND TRADEMARK OFFICE
CERTIFICATE OF CORRECTION

PATENT NO.       : 7,545,956 B2
APPLICATION NO.  : 11/202917
DATED            : June 9, 2009
INVENTOR(S)      : Shunji Miyahara It is certified that error appears in the above-identified patent and that said Letters Patent is hereby corrected as shown below:

On the Title Page

Item (75), delete "Yokohama" and substitute --Yokohama-shi-- in its place.

Item (57), line 6, under "ABSTRACT", before "output a sonar" delete "an" and substitute --and-- in its place.

Page 2, Item (56), line 2, before "Night Times" delete "an" and substitute --and-- in its place.

Page 2, Item (56), line 9, before "Jun. 21," delete "Story_662334," and substitute --Story_ID=662334,-- in its place.

In column 7, claim 1, line 8, delete "a tan(-rc/hc)" and substitute --atan (-rc/hc)-- in its place.

In column 8, claim 15, line 2, delete "a tan(r1/(hw-hc))" and substitute --atan (r1/(hw-hc))-- in its place.

In column 8, claim 16, line 29, delete "a tan(-width_w/(2r1))+$\pi$/2" and substitute --atan (-width_w/(2r1))+ $\pi$/2-- in its place.

In column 8, claim 17, line 57, delete "a tan(width_w/r1)+$\pi$/2" and substitute --atan (width_w/r1) + $\pi$/2-- in its place.

In column 9, claim 18, line 8, after "the window" delete "Position" and substitute --position-- in its place.

In column 9, claim 18, line 11, delete "a tan(-r1/hc)" and substitute --atan (-r1/hc)-- in its place.

In column 10, claim 42, line 35, delete "a tan(r1/(hw-hc))" and substitute --atan (r1/(hw-hc))-- in its place.

In column 10, claim 43, line 47, after "image," delete "reach" and substitute --each-- in its place.

UNITED STATES PATENT AND TRADEMARK OFFICE
CERTIFICATE OF CORRECTION

PATENT NO. : 7,545,956 B2
APPLICATION NO. : 11/202917
DATED : June 9, 2009
INVENTOR(S) : Shunji Miyahara It is certified that error appears in the above-identified patent and that said Letters Patent is hereby corrected as shown below:

In column 10, claim 43, line 56, delete "a tan($-width_{13}/(2*r1))+\pi/2$" and substitute --atan $(-width\_/(2*r1)) + \pi/2$-- in its place.

In column 10, claim 44, line 1, before "method for determining" insert --A--.

In column 12, claim 44, line 2, delete "a tan(width_w/($2*r1))+\pi/2$" and substitute --atan (width_w/($2*r1)) + \pi/2$-- in its place.

Signed and Sealed this

Fifteenth Day of September, 2009

David J. Kappos
*Director of the United States Patent and Trademark Office*